Figure 1:
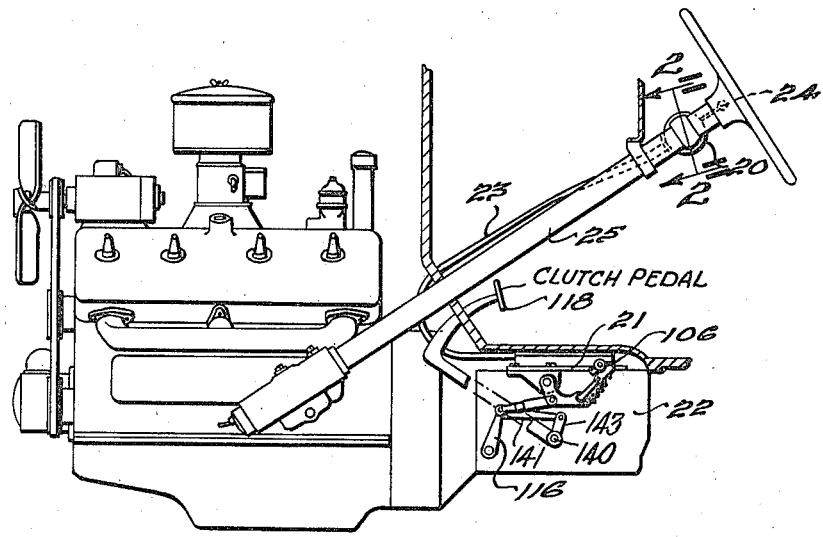

Feb. 4, 1941.  E. H. PICKETT  2,230,847
GEAR SHIFTER
Filed July 21, 1937  5 Sheets-Sheet 1

INVENTOR
Earl H. Pickett.
BY Paul Heffler
ATTORNEY

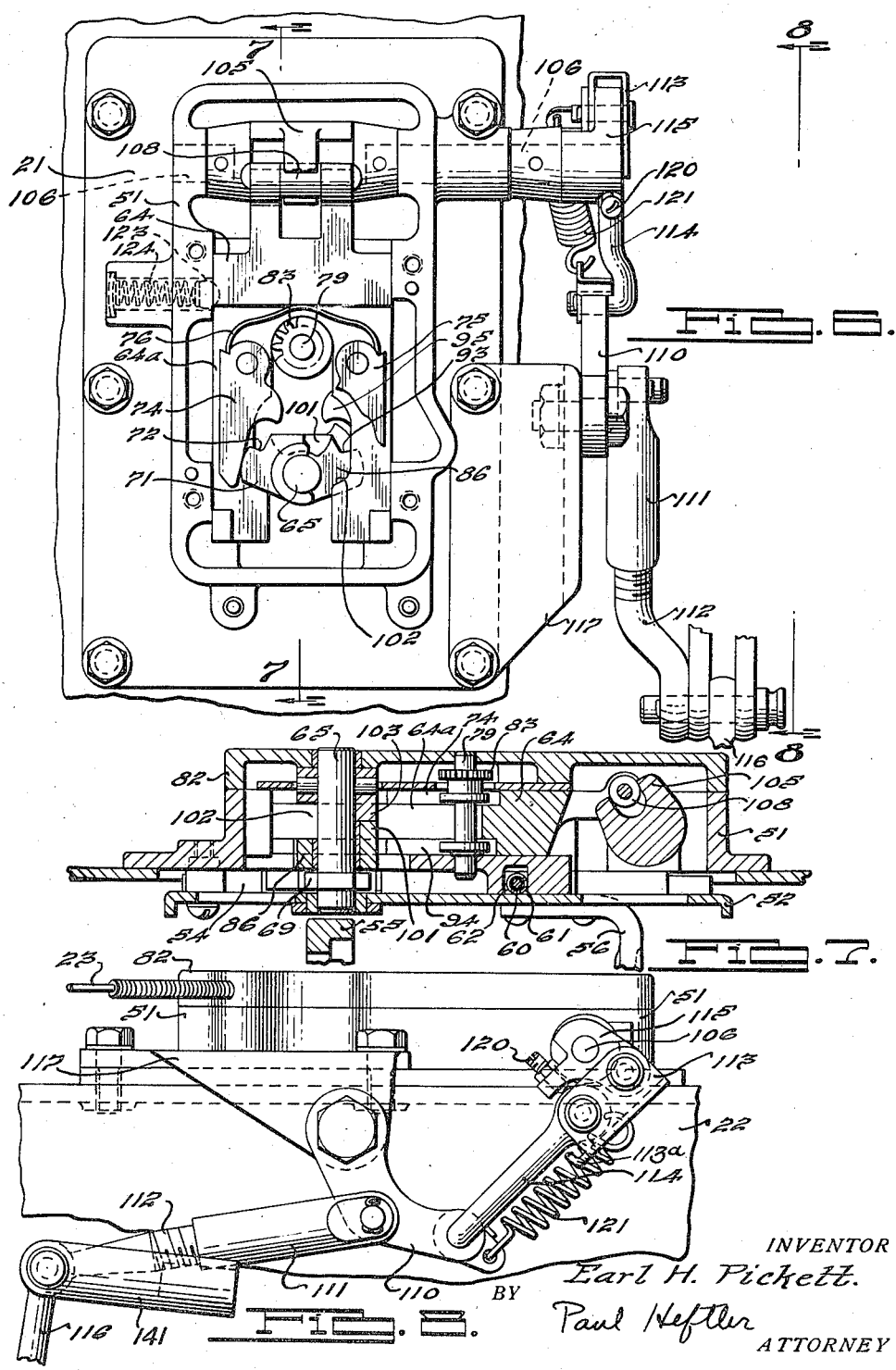

Feb. 4, 1941. E. H. PICKETT 2,230,847
GEAR SHIFTER
Filed July 21, 1937 5 Sheets-Sheet 3
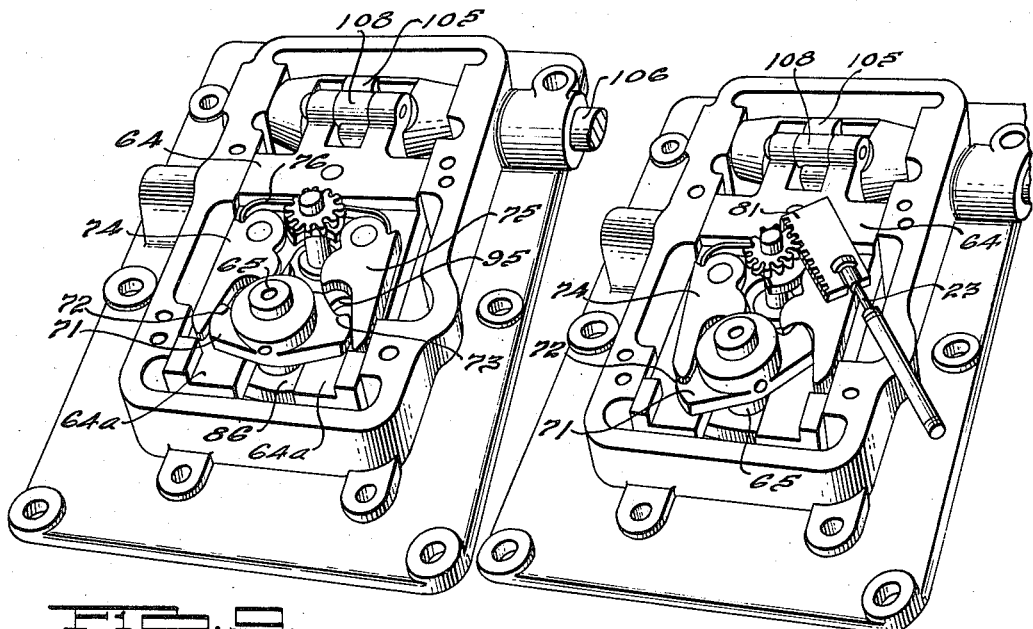
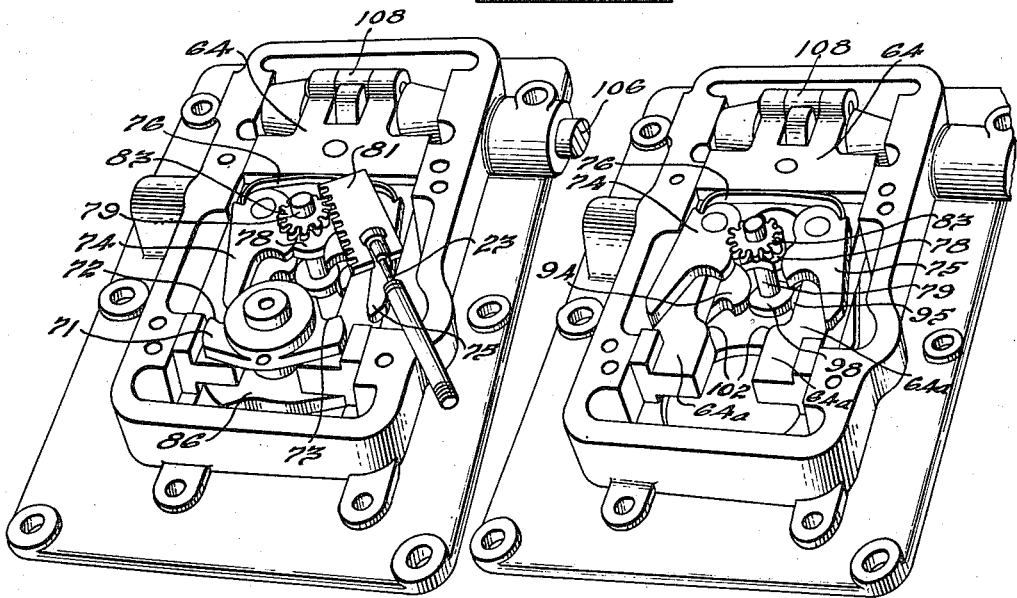
INVENTOR
Earl H. Pickett.
BY Paul Hefter
ATTORNEY Feb. 4, 1941. E. H. PICKETT 2,230,847
GEAR SHIFTER
Filed July 21, 1937 5 Sheets-Sheet 4
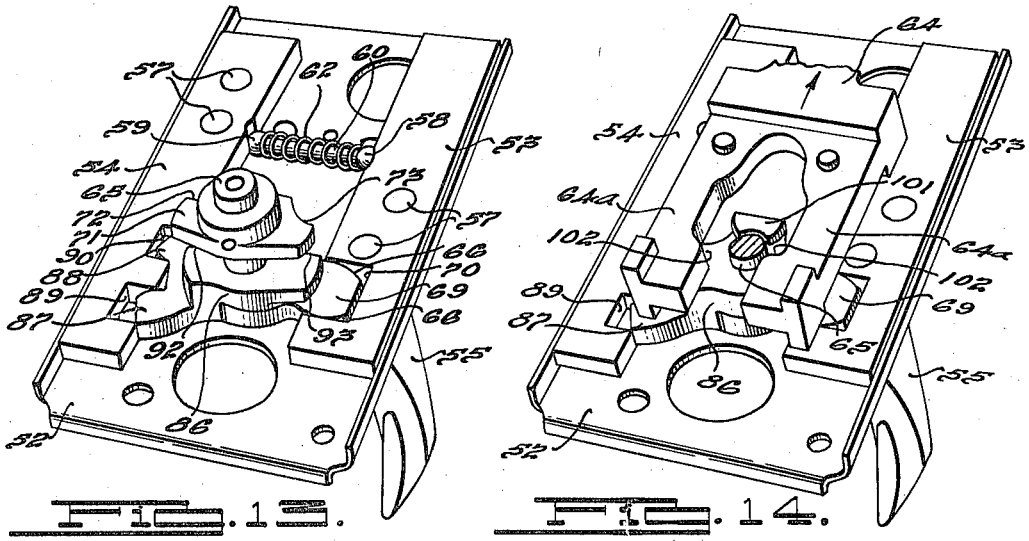
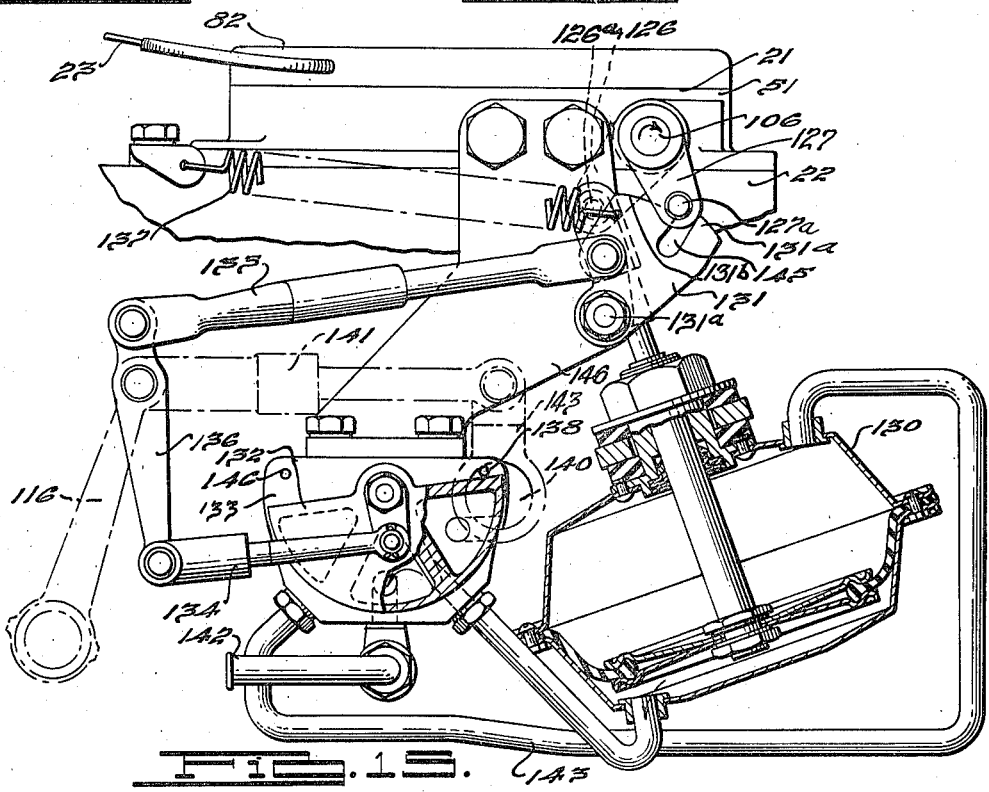
INVENTOR
Earl H. Pickett
BY Paul Hefller
ATTORNEY

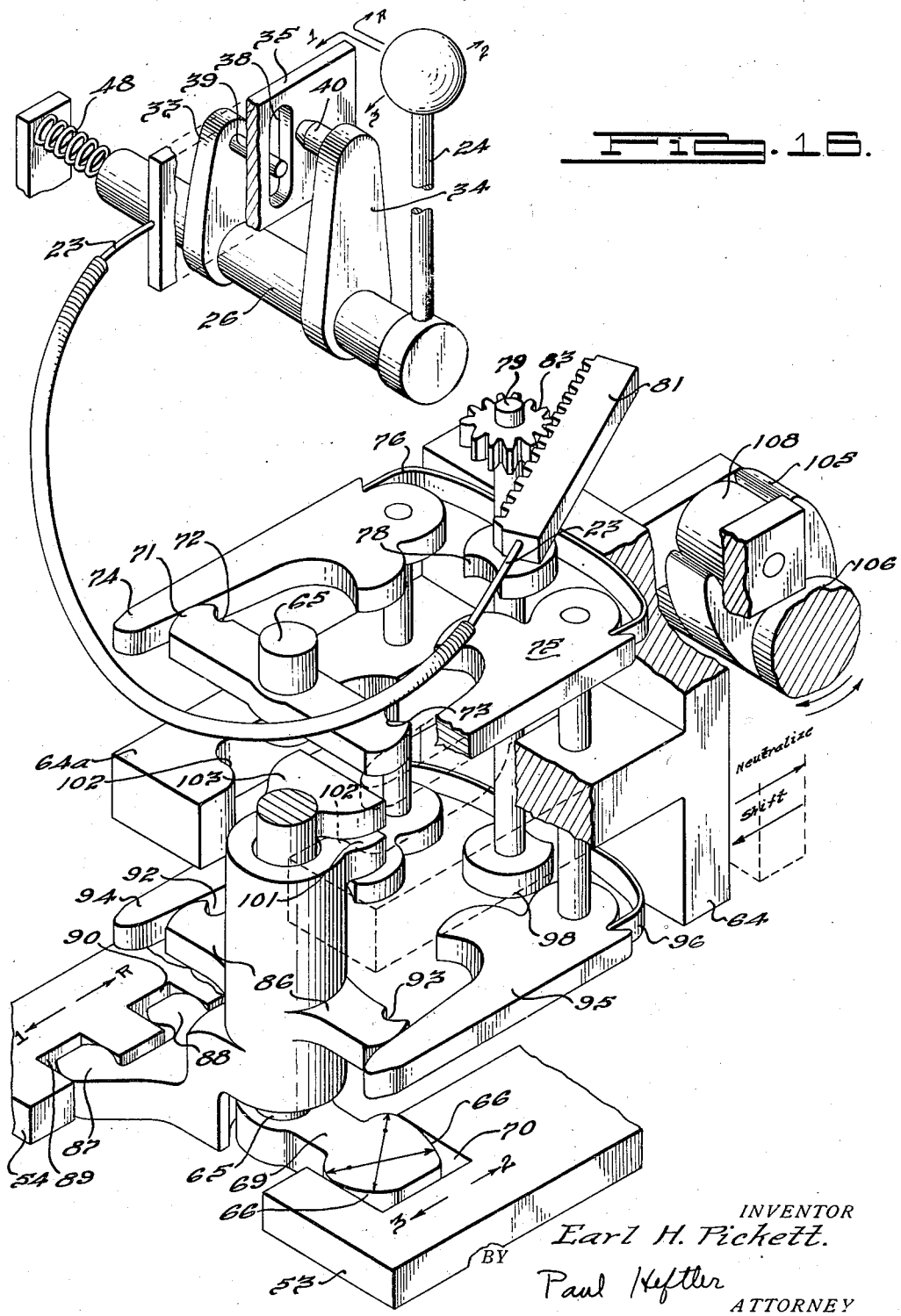

Patented Feb. 4, 1941

2,230,847

UNITED STATES PATENT OFFICE 2,230,847

GEAR SHIFTER

Earl H. Pickett, East Tawas, Mich.

Application July 21, 1937, Serial No. 154,718

15 Claims. (Cl. 74—334)

This invention relates to a shifter for sliding gear transmissions, such as are commonly used in automobiles, and has for one of its objects the provision of a compact mechanism by which power from any convenient source may be applied and controlled mechanically to shift the gears in such a transmission in whichever way the operator may select.

Devices have been constructed in which pneumatic or other form of mechanical power employed to shift gears has been directed or controlled by a network of electric wires and switches. While such devices have enjoyed moderate commercial success, they have not been entirely satisfactory because of the occasional failure of one or the other of their many switches to make an effective contact or the inability of the available electric control power to overcome unusual resistances such as frost in the valves controlling the pneumatic power.

Other devices for power shifting have been proposed, such as pneumatic motors controlled by a network of valves and pipes, which are free of the above-mentioned troubles accompanying electric control, but which, in common with the electrically controlled type, involve the use of a plurality of motors and are so spread out that they must be installed part by part in the automobile.

One object of the present invention is to provide a gear shifter that is free of the above faults, that can be installed almost entirely as a single assembly, and that involves no switches and at most only one valve.

Mechanically operated and controlled gear shifters have been proposed and some have been constructed experimentally, but these have all been comparatively bulky and, in some cases, larger than the transmission itself. In most automobiles of the present day the space for the transmission lies under the floor behind the clutch in the forward angle of the deep diagonal X-braces of the frame. This space is generally not large enough to accommodate much more than a transmission and cannot also receive a shifter of any size. It is therefore an object of the present invention to provide an extremely compact shifter which can be secured directly to or made a part of the transmission without greatly increasing its size. This has been accomplished by designing the shifter so that all of the parts in what would otherwise be its bulky portion slide, rotate, or swing only in planes parallel to one another and no space is needed for movement in any other direction, thus permitting the shifter to be made very flat and compact.

Another object of this invention is the provision of a shifter which is largely built into a transmission cover which can be interchanged with a cover carrying the conventional manual shift lever, so that a gear shifter can be easily installed on cars already built or designed without one.

Another object of this invention is the provision of a simple gear shifter selector mechanism having successive positions for the various transmission speeds and a control lever having an H-movement similar to that of the conventional manual shift lever and connected to the selector member to give it a continuous or single type of movement. More specifically, it is an object of this invention to connect a control handle or lever to a selector camshaft so that movement of the end of the lever to the four ends of an H-shaped path will rotate the camshaft to four different positions.

Other objects of this invention are to provide efficient, compact, cheap, sturdy mechanisms for performing the various operations required in selecting and in shifting gears.

Other objects of this invention will appear in the following description and appended claims, reference being had to the accompanying drawings forming a part of this specification, wherein like reference characters designate corresponding parts in the several views.

Figure 2:
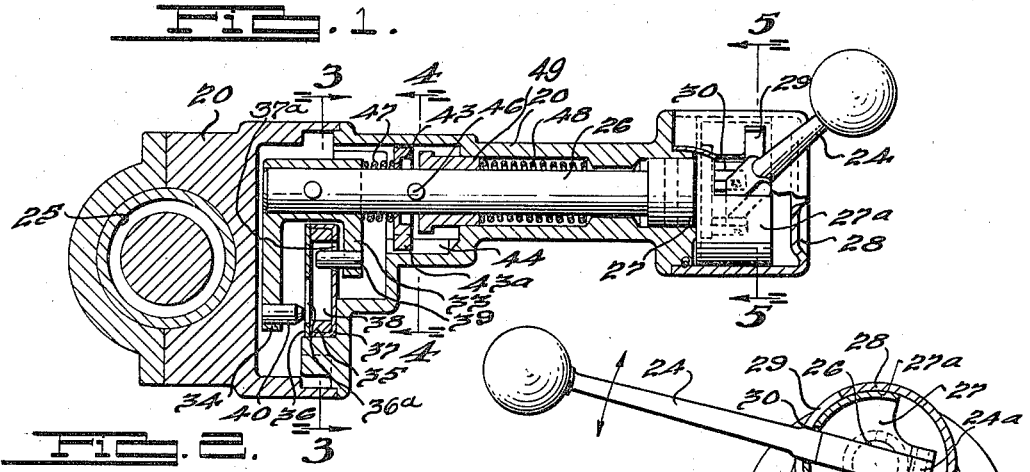

In the drawings,

Figure 1 is a side view of one of the preferred embodiments of the invention as it is installed, Figure 2 is chiefly a section on the line 2—2 of Figure 1 showing the construction of the control unit or "hand,"

Figures 3, 4:
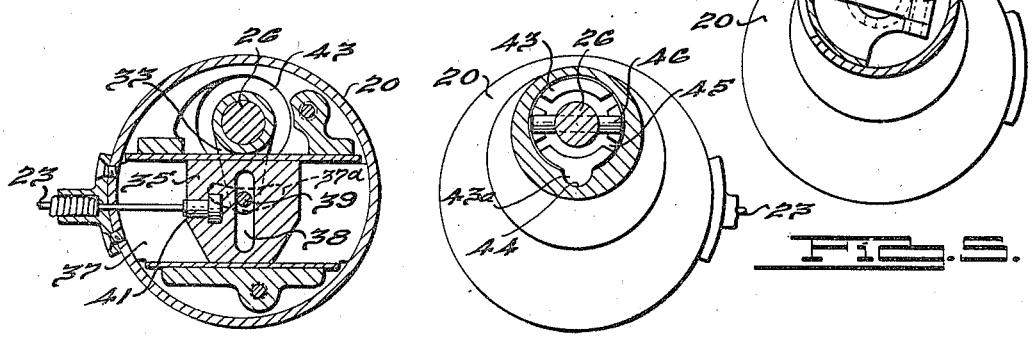

Figure 3 is a cross section on the line 3—3 of Figure 2, looking in the direction of the arrows, Figure 4 is a cross section on the line 4—4 of Figure 2 looking in the direction of the arrows, Figure 5 is a cross section on the line 5—5 of Figure 2 looking in the direction of the arrows, Figure 6 is a top plan of the shifter unit with the cover removed and parts broken away to show the internal structure whose parts are shown in positions occupied when the gears are in neutral, the selector mechanism is set for neutral, and the block is in its "engaged" or "shifting" position with the clutch just disengaged, Figure 7 is a vertical longitudinal section on the line 7—7 of Figure 6, Figure 8 is a side elevation taken from the line 8—8 of Figure 6 and showing one form of linkage for actuating the shifter, Figure 9 is a perspective view of the shifter with the cover removed and the parts in the positions occupied when the gears are in neutral and the other parts occupy the positions as in Figure 6, Figure 10 is a view similar to Figure 9 but with a shift into second partly made so that the block is shown in its "disengaged," "neutralizing," or "withdrawn" position, moving toward its "engaged" or "shifting" position, Figure 11 is a view similar to Figure 9 but with a shift into second completed so that the block is in its "extended," "shifting," or "engaged" position, Figure 12 is a view similar to Figure 9 but with the parts in the positions occupied when a shift into neutral is partly made, so that the block is moving toward its "withdrawn" or "neutralizing" position, and with certain interior parts removed to more clearly show those remaining, Figure 13 is a perspective view of the interior parts missing in Figure 12, Figure 14 is a perspective view of certain of the interior parts in their correct relation, with other parts removed or broken away, Figure 15 is a side elevation showing a modified form of linkage for supplying power to the shifter unit, and Figure 16 is a diagrammatic spread out isometric view of the moving parts of the shifter unit and of the most important moving parts of a similar form of the control unit or "hand" modified slightly to simplify the illustration. The parts are shown in the same positions as in Figure 6.

Before explaining in detail the present invention, it is to be understood that the invention is not limited in its application to the details of construction and arrangement of parts illustrated in the accompanying drawings, since the invention is capable of other embodiments and of being practised or carried out in various ways. Further, it will be apparent that the various features and aspects of the present invention may be used advantageously in other relations or in other types of shifter mechanisms within the scope of the appended claims. Also it is to be understood that the phraseology or terminology employed herein is for the purpose of description and not of limitation, and it is not intended to limit the invention beyond the terms of the several claims hereto appended as considered in view of the prior art and the requirements thereof.

The particular form of the invention shown in the drawings comprises a control unit 20, which is mounted where it may be easily reached by the operator of the vehicle, as on the steering wheel column, and a remote shifter unit 21 mounted on the transmission 22. The two units are connected by simple means or a push-pull type of connection such as the Bowden wire 23 so that, by manipulating the control unit 20, the operator can set the shifter unit 21 to shift the gears into the desired position. The shifting takes place when power is supplied to the shifter unit 21 which generally is after the control unit 20 has been set for the desired shift; thus the device is preselective in the preferred embodiment shown.

While a lever swinging in one plane or in a single continuous path along which are spaced, one after another, the positions for reverse, neutral, first, second, and third speeds, may be used to position the Bowden wire 23, it has been found desirable to provide a control unit 20 by which the Bowden wire 23 can be moved to its five positions by moving one arm of the control lever or the handle 24 to the middle and the four ends of the conventional H-shaped path to which the public is accustomed. The structure of such a control unit is shown in Figures 2 to 5.

The upper left hand portion of Figure 16 shows this control unit schematically or in a somewhat modified form in which the same reference characters are used for corresponding parts. In Figure 16, to simplify the illustration of the operation, the control handle 24 is shown as fixed to shaft 26. However, in the remaining figures, 24 is shown as a lever having a fulcrum on the edges of the slot 29 and being pivotally connected to the shaft 26 at its lower end. Hence, in Figure 16 the relative positions of 39 and 40 are shown as reversed from their positions in the preferred embodiment.

The control unit 20 is clamped to the steering column 25 and contains a shaft 26 which can be both rotated and slid endwise a short distance. The outer end of the shaft 26 has a head 27 pivotally fixed to it and enclosed by a cap 28 on the end of the control unit 20. The control handle 24 is pivoted at one end 24a to the head 27 and projects through a narrow slot 29 extending part of the way around the cap 28. Thus, when the projecting end of the handle 24 is moved sideways in the plane of the shaft 26, the sides of the slot 29 act as a fulcrum and the inner end 24a of the handle moves the head 27 and the shaft 26 endwise in either direction for the crossover motion.

The head 27 has a cylindrical skirt 27a which fits the inside of the cap 28 and which also has a slot 30 through which the handle 24 passes. This slot 30 is at right angles to the slot 29 in the cap 28 so that the skirt closes up all of the slot 29 in the cap 28 except that portion through which the handle 24 projects. At the same time, the slot 30 and the pivot at the end 24a of the handle prevent the shaft 26 from rotating with respect to the handle 24, so the shaft 26 turns as the handle is swung around in the slot 29 in the cap 28. Thus in the preferred form the handle 24 is itself a lever having its fulcrum at 29 for lateral swinging and the shaft 26 as its fulcrum for longitudinal swinging. Hence, this handle has swinging movements about two transverse horizontal pivots for movement in its H-shaped path in the same fashion as the conventional present-day floor-mounted gear shift lever. Of course this path of motion or the mechanism may be modified if desired. For example, in the schematic showing of Figure 16 the handle 24 is shown as being fixed on the shaft 26 and hence is slidable laterally and swingable longitudinally.

The end of the shaft 26 opposite the handle 24 carries a pair of parallel arms 33 and 34 at right angles to the shaft 26. Thus, although the handle 24 is itself a lever, it is, or may be considered as, one arm of the larger lever having a substantially horizontal transverse fulcrum pivot, which is shaft 26, and which lever has handle 24 as one arm and either 33 or 34 as the other arm. In the form of Figure 16, handle 24 is a rigid arm of this lever. These arms 33 and 34 extend on either side of a slidable member or block 35 which can slide in a guideway 36, 37, in a plane perpendicular to the shaft. The block 35 has a slot 38 through it and the arms 33 and 34 carry pins 39 and 40 arranged so that, as the shaft 26 is slid back and forth, one pin 39 or the other pin 40 enters the slot 38. Thus, when the shaft 26 is rotated, the block 35 will be slid along its guideway 36, 37, by one pin 39 or the other pin 40. The guideway 36, 37 has slots or openings 36a and 37a respectively in each side to permit pin 39 or pin 40 to enter slot 38 as shown in Figure 2. Of course, these slots 36a and 37a in the guideway are long enough to permit full swinging movements of pins 39 and 40.

The pin 40 on one arm 34 is farther from the shaft 26 than the other pin 39, so that rotation of the shaft 26 through the same angle will cause the block 35 to slide different distances, depending upon which pin is engaged with the slot 38. The two pins 39 and 40 are long enough so that one pin cannot be withdrawn from the slot 38 before the other pin enters it. Since the two pins 39 and 40 are at different distances from the shaft 26, there is only angular position of the shaft 26 at which this can be done. Thus the shaft 26 can be slid endwise only when it is in its neutral position and the handle 24 can move only in an H-shaped path.

With this arrangement, the block 35 will slide along a straight path as the handle 24 is moved about in its H-shaped path, and five evenly spaced positions of the block 35 will correspond to the five positions of the handle 24 in the crossover portion and the four ends of the legs of its path. The block 35 transmits its motion directly to the Bowden wire 23, the wire 23 having a flanged sleeve 41 swaged onto its end and fitting into a T slot in the block 35.

A spring latch is provided to resiliently hold the shaft 26 and consequently the handle 24 in any one of their five positions. This latch comprises a washer 43 in which the shaft 26 can turn and which is itself held from rotating by a lug 43a which fits into a groove 44 in the housing of the control unit 20. One face of the washer 43 contains radial notches or grooves 45 into which can fit one side of a pin 46 projecting through the shaft 26. A spring 47 presses the washer 43 along the shaft 26 and against the pin 46 so that the shaft 26 is resiliently held in each of the positions in which the pin 46 fits into a notch 45.

If it is desired that the handle 24 normally remain on one side of its H-shaped path when it is in its neutral position, this can be accomplished by providing a spring 48 to push the shaft 26 endwise in one direction. In the embodiment illustrated, the spring 48 bears against a bearing sleeve 49 secured on the shaft 26 and tends to keep the handle 24 on the side of its path corresponding to second and third speeds. To enable the spring 48 to be made very light, the pins 39 and 40 that engage the sliding block 35 are arranged so that the pin 39 which is moved into the slot 38 in the block 35 by the spring 48 always moves into it without friction. This is accomplished by making the pin 39 appreciably smaller than the slot 38 and making the other pin 40 practically as big as the slot 38. Then, when the handle 24 is in neutral and the large pin 40 leaves the slot 38, there will be clearance on both sides of the small pin 39. However, when the block 35 is moved to one side by the small pin 39 and then returned towards neutral, it will not quite be returned to neutral because of the lost motion caused by the clearance between the small pin 39 and the sides of the slot 38. To enable the large pin 40 to get into the slot 38 under these conditions, its end is tapered so that its extreme end is smaller than the small pin 39. Then, as the shaft 26 is slid endwise and the large pin 40 enters the slot 38, the tapered portion on the pin 40 accurately centers the block 35 and allows the body of the pin to enter the slot. It will be apparent that this control unit 20 embodies a particularly simple and efficient mechanical movement adapted for remote mounting and to be connected to the shifter unit by a single connection, such as the Bowden wire 23. This mechanical movement with its few parts not only translates the H-path movements of the handle into easily transmitted linear movements of the selector or control organization 35, 23, 81, but the same mechanism gives the H-path of the movements to the free end of the handle 24 (eliminating the necessity for a gate or the like) and also serves to translate the lateral and longitudinal movements of the handle end into a single type of motion or push-pull movements of member 35 which can be readily transmitted along the steering post.

The control unit and the shifter unit are shown and described herein as being applied to a conventional automobile which is shown as a 1936 Ford. The transmission 22, the clutch operating lever arm 116, the clutch pedal 118 (as shown in Figure 1), and the connecting link 141 between the arm 116 and the clutch pedal shaft 140 are all standard and unaltered Ford parts.

The shifter unit 21 comprises a flat housing 51 adapted to be bolted to the top of the transmission 22 in lieu of the conventional transmission cover and the conventional gear shift lever. A flat pan 52 (seen in Figs. 7, 13, and 14) is secured to the bottom of the housing 51 and carries two slidable shift rails 53 and 54, one of which is for shifting into second and third speeds and the other of which is for first and reverse. Each of the rails 53 and 54 has a fork 55 or 56 secured to it by rivets 57 and depending into the transmission 22 and engaging the proper slidable element.

The two rails 53 and 54, shown in their neutral or intermediate positions in Figure 13, are provided with a latch and interlock mechanism to resiliently hold them in their neutral positions and to positively prevent one rail from leaving its neutral position until the other is returned to it. This mechanism comprises two balls 58 and 59 and a rod 60 lying in a straight line between the two rails 53 and 54 in a groove 61 in the bottom of the housing 51. A spring 62 around the rod 60 presses the two balls 58 and 59 apart and into notches in the shift rails 53 and 54, thus resiliently holding the latter in their neutral positions. There is just enough clearance at the ends of the rod 60 to allow one of the balls 58 or 59 to be forced out of its notch as one of the shift rails 53 or 54 is moved from its neutral position. After the clearance is taken up, the other ball is positively held in its notch and the other shift rail thus locked against movement until the first rail is returned to neutral.

The rails 53 and 54 are moved as may be necessary to make a desired shift by a block 64. The block 64 is slid back and forth from the position shown in Figures 6 and 9 to the position shown in Figure 10 and back to the position shown in Figure 11, which is the same position as the first, each time a shift is made, and a comparatively simple system of pawls and other mechanical elements converts this movement of the block 64 into the proper movement of the proper rail 53 or 54 to effect the desired gear shift. This system of mechanical elements comprises a multi-armed lever 71, 65, 69 having the short vertical shaft 65 as its pivot or fulcrum, said lever being connected to the shift rail 53 so that swinging of the lever or rotation of the shaft 65 slides the rail 53. The lower end of shaft 65 has a rotatable bearing in the pan 52 as shown in Figure 7. The upper end of shaft 65 has a bearing in housing 51 as also shown in Figure 7. This connection may be a gear sector and a rack, a lever arm, cam surfaces, or any equivalent structure. In the particular embodiment of the invention illustrated, cam surfaces 66 at the outer end of the lever arm 69 have been employed, the end of the lever arm 69 bearing the cam surfaces being similar to a single gear tooth. Lever arm 69 is, of course, fixed on or integral with shaft 65.

The outer end of the lever arm 69 fits into a rectangular notch 70 in the second and third speed shift rail 53 and the cam surfaces 66 on it are shaped so that they are always in contact with both sides of the notch 70, preventing lost motion, and so that equal movements of the lever arm 69 in opposite directions will move the shift rail 53 different distances from its neutral position. This is accomplished by shaping the cam surfaces 66 so that each is composed of two cylindrical segments merging into each other and having centers and radii laid out as shown in Figure 16. It will be noted that there are two centers and that, for any position of the cam surfaces 66 in the notch 70, the two cylindrical portions of the two cam surfaces in contact with the sides of the notch 70 have a single common center. Also, as the lever arm 69 swings from one extreme position to the other, the lines of contact between the cam surfaces 66 and the sides of the notch 70 will move from one pair of cylindrical portions of the cam surfaces having a common center to the other pair of cylindrical portions having the other center. Since these two centers are at different distances from the shaft 65, it is obvious that the movement of the shift rail 53 will be greater in one direction from neutral than the other. Specifically, the side of the lever arm whose outer end cylindrical cam surface has its center nearest to the lever arm axis or 65 will move the rail a shorter distance than will the other side of the lever arm whose cylindrical cam surface has its center farther out from the lever arm axis for equal angular movements in either direction. This is desirable when the shifter is used with transmissions having different shift rail movements and the mechanism employed for moving the sliding block 64 is of a type which returns it to a fixed position. When the transmission has equal shifts or when the mechanism for returning the sliding block 64 to its "shift" position has a resilient element, such as a spring or a pneumatic motor, this refinement may be omitted and the lever arm 69 and notch 70 may be replaced by a gear sector and a series of rack teeth.

The upper end of the vertical shaft 65 has transverse or oppositely extending shifting lever arms 71 securely pinned to it. The ends of these lever arms 71 lie on top of the two arms 64a of the sliding block 64 and are provided with notches 72 and 73. When the lever arms 71 are in their neutral or intermediate position, as shown in Figs. 9 and 10, and the block 64 is withdrawn to its "neutralizing" or "withdrawn" position, as shown in Figure 10, either one of two pawls 74 and 75 carried by the block 64 can swing in past one of the lever arms 71 and into line with one of the notches 72 or 73, the pawls being pressed in by a spring 76.

Which one of the pawls swings in, if either, is determined by a cam 78 on a camshaft 79 journalled in the housing 51. The cam 78 is in the shape of a disc with a large notch and is located so that, when the block 64 is in its "neutralizing" or "withdrawn" position or is sliding into or out of this position, one or both of the pawls 74 and 75 will rest upon the unnotched portion as the block slides toward its "shifting" or "extended" position and be prevented from swinging into a position for engaging the notches 72 and 73 in the lever arms 71 until one or both of the pawls have passed the ends of the lever arms 71 as shown in Figure 9. Thus, it will be apparent that the fixed axis cam 78 is so shaped and positioned as to cooperate with the pawls 74 and 75 carried on the moving block 64 as to prevent either or both of said pawls from swinging in until after the tips of the pawls have passed the ends of the corresponding lever arms 71. Also, it will be apparent that the camshaft 79, its cams, and the pawls can be selectively adjusted at any time except possibly for the very short interval during the motion of the block when a pawl is pushing a lever arm and is engaged in its notch. Thus, by rotating the camshaft 79 and cam 78 to the proper position, either or both of the pawls 74 and 75 can be made inoperative. This rotation is accomplished by a rack 81 which is slidably mounted in the cover 82 of the housing 51 so as to engage a gear 83 on the camshaft 79. The rack 81 is connected to the lower end of the Bowden wire 23 and therefore moves with the small sliding block 35 in the control unit 20 to which the upper end of the wire is connected.

In Figure 10, the camshaft 79 is shown in a position to allow the pawl 74 at the left to swing inwards. Then, when the sliding block 64 returns to its "shifting" position, as shown in Figure 11, the pawl 74 engages the notch 72 in the shift lever 71, pushing one end of and rotating the lever. This rotates the shaft 65, swings the lever arm 69 at the lower end of the shaft, and slides the shift rail 53 engaged by the lever to its second speed position. Similarly, if the camshaft 79 is rotated to a position to allow the other pawl 75 to swing inwards, the notch 73 at the other end of the shift lever arms 71 would be engaged, the shaft 65 and lever arm 69 would be swung in the other direction, and the shift rail 53 would be moved to the other direction to its third speed position. Thus, by properly positioning the camshaft 79 whenever desired, the shift rail 53 can be made to remain in its neutral position or to move to either its second or third speed positions upon a movement of the sliding block 64 from its "shifting" position to its "neutralizing" position and back to its "shifting" position.

The other shift rail 54 is moved to its first speed and reverse positions by a mechanism similar to that used for the second and high shift rail 53 and described above. This mechanism comprises an intermediate lever 86, 87, 88 which can rotate on the vertical shaft 65 and whose oppositely extending arms 86 lie between the two lever arms 69 and 71 fixed to the shaft. The rotatable intermediate lever 86, 87, 88 performs the same functions for the first and reverse shift rail 54 as the upper and lower lever arms 69 and 71 perform for the other shift rail. To do this, it has two sections made integral with each other and corresponding to the lever arms 69 and 71.

The lower section or lower arm of the intermediate lever comprises two lugs or teeth 87 and 88 which fit into rectangular notches 89 and 90 in the first and reverse shift rail 54. The lateral surfaces of each of the teeth 87 and 88 which engage the sides of the notches 89 and 90 are cylindrical, the two sides of each tooth having a single center of curvature but not necessarily the same radius. Thus each tooth will touch both sides of its notch irrespective of its angular position and there will be a minimum of lost motion. To prevent "fight" between the two teeth 87 and 88, they are arranged so that, as the lever arm 86 swings in one direction or the other from its neutral position, one tooth or the other swings out of its notch so that, except for a slight overlap, only one tooth is in action at a time.

Since there are two centers of curvature of the cam surfaces on the two teeth 87 and 88, they can be arranged to give different distances of movement of the shift rail 54 for equal rotations of the lever 86 which carries them. This is accomplished by placing the two centers so that, when the lever 86 is in its neutral position, they lie on a line parallel to the shift rail 54 but at different distances from a line perpendicular to the shift rail and through the center of the shaft 65 upon which the lever is pivoted.

The upper section or upper arms of the intermediate lever 86, 87, 88 is similar in form and function to the lever arms 71 fixed to the top of the vertical shaft. The two ends of this upper section extend under the two arms 64a of the sliding block 64 and are provided with notches 92 and 93 which can be engaged by pawls 94 and 95 carried on the bottom of the block 64 by the lower ends of the same pins that carry the pawls 74 and 75 on the top. The pawls 94 and 95 are pressed inward by a spring 96 and are controlled by a cam 98 mounted on the same shaft 79 as and below the cam 78 for the upper pawls 74 and 75.

The two cams 78 and 98 are so oriented on their shaft 79 that there are four positions of the shaft in each of which a different one of the four pawls 74, 75, 94, and 95 can fall into action, and at least one position in which all are held out of action. These five positions are secured by placing the handle 24 of the control unit 20 in its five different positions. Thus, by previously or at any time placing the handle 24 in the appropriate position and then causing the sliding block 64 to move to its "neutralizing" position and back to its "shifting" position by actuation of the clutch pedal 118, the gears of the transmission 22 can be shifted to any speed or left in neutral, as desired.

It will be noted that the shifting into gear takes place during the second one of the two movements of the sliding block 64 corresponding to the two movements of the clutch pedal 118, that is, the movement from the "neutralizing" position shown in Figure 10 to the "shifting" position shown in Figure 11 which occurs during the first part of the upward movement of the clutch pedal. This first movement from the "shifting" position to the "neutralizing" position is employed for returning to neutral any gear that may be engaged, before starting to engage another. For this purpose, the lever 86, 87, 88 that moves the first and reverse shift rail 54 is provided (as shown in Figure 14) with a neutralizing cam 101 which projects up between the two arms 64a of the sliding block 64, and the two arms 64a are formed with neutralizing shoes or bosses 102 which project towards each other so as to just allow room between them for the neutralizing cam 101. Thus, if the neutralizing cam 101 is at either side of its neutral intermediate position shown in Fig. 14, it will be returned to it as the sliding block 64 moves in the direction of the arrow shown in Figure 14 to its "neutralizing" position.

The neutralizing cam 101 on the intermediate lever 86, 87, 88 is only one-half as thick as the neutralizing shoes or bosses 102. This allows room for a second neutralizing cam 103 (seen in Figure 7 and in Figure 16) on the bottom of and integral with the lever 71, 65, 69 secured to the top of the shaft 65. This second cam 103 has the same shape as and functions exactly like the other cam 101 but it returns the second and high shift rail 53 to neutral. Thus, if either shift rail is away from its neutral position, it is returned to neutral as the sliding block 64 is moved to its "neutralizing" position, and the shifter is ready to shift into any preselected speed or to remain in neutral upon the return movement of the block to its normal shifting position according to the position of the selector cams 78 and 98.

Any one of a number of means may be employed to move the sliding block 64. For transmissions requiring quick engagement of the gears, the necessary action can be conveniently secured by a cam and a spring, the cam being rotated through a ratchet oscillated back and forth at each down and up movement of the clutch pedal and serving to move the sliding block to its "neutralize" position and the spring serving to snap the block back to "shift" position as soon as the cam passes dead center. It has, however, been found desirable with some transmissions to place both the neutralizing and shifting movements of the sliding block 64 under the control of the operator. This can be conveniently accomplished by the mechanism shown in Fig. 1 and in part and on a larger scale in Figs. 6, 7, and 8.

This mechanism for moving the block 64 comprises a lever arm or fork 105 fixed to stub shafts 106 journalled in the shifter housing 51. The fork 105 embraces a roller 108 carried by the sliding block 64 so that rocking of the stub shafts 106 and fork 105 back and forth causes the block 64 to move between its "shifting" and "neutralizing" positions. Note that the mechanical advantage of this fork and roller connection varies as the parts move, being greatest near the middle of the movement. This construction provides the greatest force near the mid-points of the movement of the shift rails 53 and 54 away from their neutral positions. This feature is desirable since most conventional transmissions, such as that of the 1936 Ford shown herein, have synchronizing cones including resilient snaps or other equivalent synchronizing mechanisms which offer additional resistance to shifting movement at or about the middle of the shifting travel. Since the details of transmissions, including their synchronizing mechanisms, are well known and, per se, form no part of the present invention, they are not illustrated herein. However, a transmission of this general type is shown in the patent to Griswold, No. 2,085,-

019. Thus this construction gives a greater mechanical advantage at points where it is most needed, which are the points at which the synchronizing cones of the transmission 22 come into engagement and additional force is needed to disengage the resilient snaps forming part of the synchronizing mechanism.

The stub shaft 106 which carries the fork 105 is rotated by a linkage 110 to 115 connecting it with the standard clutch operating lever arm 116. As shown in Figure 8, this linkage comprises an intermediate lever 110 pivoted on a bracket 117 bolted to the shifter housing 51, an adjustable link 111, 112 connecting the intermediate lever 110 to the standard clutch operating lever arm 116, and a toggle link 113, 114 connecting the intermediate lever 110 to a lever 115 fixed to the stub shaft 106. As shown in Figure 8, the lower left-hand portion of the toggle part 113 has a bent over extension 113a which will engage toggle part 114 to prevent the toggle from breaking or folding upward to the left. The adjustable link 111, 112 is set so that the linkage is in the position shown in Figures 1 and 8 when the clutch operated by the clutch operating lever arm 116 is just disengaged or is at its cushion point. This link 111, 112 can be adjusted from time to time to correct for changes in the point along the travel of arm 116 at which the clutch engages due to wear or the like. Then further downward movement of the clutch pedal 118 will move the clutch lever 116 to the left in these figures and will rotate the shifter actuating shaft 106 clockwise as seen in Figures 1 and 8, thus causing the sliding block 64 within the shifter to move to the right in Figure 7 or toward shaft 65 or from its "engaged" or "shifting" position to its "disengaged" or "neutralizing" position. As the clutch pedal 118 is released, the linkage 110 to 115 will be returned to the position shown in Figures 1 and 8 and the sliding block 64 will be returned to its "shift" position, accomplishing whatever shift the shifter has been set for. At this point, a set screw 120 carried by the lever 115 on the shifter actuating shaft 106 comes into contact with the joint in the toggle link 113, 114 and breaks the toggle downwardly as seen in Figure 8 to provide a lost motion connection. This permits the clutch operating lever arm 116 to continue its movement to the right, allowing the clutch to come into engagement without this end movement of the clutch, its pedal 118 and its operating arm 116 causing any further movement of the block 64. A spring 121 acting on the two parts 113 and 114 of the toggle link holds them in line and prevents the toggle from breaking before the shift is completed. After the shift is completed and the toggle 113, 114 is broken, the sliding block 64 is retained in its "shifting" position by the spring 121 tending to straighten the toggle link and by a ball 123 (Figure 6) pressed by a spring 124 into a notch in the side of the block 64.

As shown in Figures 1, 8, and 15, the shifter linkage is connected to standard Ford parts which operate as follows. The clutch pedal 118 is fixed on and pivots on shaft 140 to which is also fixed arm 143. An adjustable length link 141 operatively connects arm 143 to the clutch operating lever arm 116.

Note that the stop or bent over extension 113a on the upper toggle portion 113 prevents the toggle from breaking upwardly and to the left, as seen in Figure 8.

A modified form of mechanism for operating the shifter unit 21 is shown in Fig. 15. In this form, the stub shafts 106 extend out on both sides of the shifter housing 21 and transmission 22, and each carries a crank 126 or 127. The pin 126a of crank 126 on one side is connected to a reciprocating air motor 130 such as a bellows or a cylinder and piston, so that movement of the air motor 130 back and forth will rock the shafts 106 and reciprocate the sliding block 64 within the shifter between its "engaged" or its "shifting" and its "disengaged" or "neutralizing" positions.

The pin 127a of crank 127 on the side opposite the air motor 130 engages a type of Geneva motion plate 131 swingably pivoted at 131a on its lower left-hand portion (Figure 15) on the valve supporting bracket 146, which plate is pivotally connected to the clutch operating lever arm 116 and to the movable member 132 of a follow-up valve 133 by suitable links 134 and 135 and a floating lever 136. The Geneva motion plate 131 is shaped so that it can swing (to the left in the figure) a short distance without rotating the crank 127 engaged with it or the shaft 106 carrying the crank, since the pin 127a of the crank 127 rides upon the curved surface 131b at the upper left-hand part of plate 131. Upon further rotation to the left, a radially extending portion 131a of the Geneva motion plate engages the pin 127a of crank 127 and rotates the crank clockwise as seen in the figure. The actual rotation of the crank 127, however, is not normally done by the Geneva motion plate 131 but by the air motor 130 controlled by the valve 132, 133.

A biasing spring 137 urges the Geneva motion plate 131 to swing to the left about its pivot and, acting through the links 134 and 135 and the floating lever 136, tends to keep the valve member 132 in the position shown. Further rotation of the valve member 132 is prevented by a stop 138. As the clutch pedal is depressed, the clutch operating lever arm 116, connected to the clutch pedal shaft 140 by a link 141, swings forward (to the left in the figure) and disengages the clutch and at the same time rotates the Geneva motion plate 131 to the left until the lug 131a on the plate engages the pin of crank 127. Because considerably more force is required to turn the crank 127 than is supplied by the light biasing spring 137, the crank 127 stops the plate 131 and further movement of the clutch lever 116 swings the floating lever 136 about its upper end and operates the follow-up valve 132, 133. As soon as the movable member 132 of the valve 133 swings to the left, engine manifold suction from a pipe 142 is amitted to the upper side of the air motor 130 through a pipe 143. This causes the motor 130 to rotate the shaft 106 in a clockwise direction and the pin of crank 127 to enter the slot 145 in the Geneva motion plate 131 and to rotate it to the left until such rotation closes off the communication between the pipes 142 and 143. Since the point at which this occurs and stops the motor 130 depends upon the position of the clutch operating lever arm 116, it can be seen that the motor 130 will follow the motion of the clutch operating lever arm 116 as long as the pin of crank 127 is in contact with the lug 131a or in the slot 145 of the Geneva motion plate 131. Thus the motor will perform all of the work of operating the shifter, but the shifter will operate exactly as if the Geneva motion plate 131 were moved directly by the clutch operating lever arm 116.

If the motor fails to operate, the movable member 132 of the follow-up valve will come up against a stop 146 when the clutch operating lever arm 116 moves in one direction and against another stop 138 when it moves in the other direction, thus holding the lower end of the floating lever 136. The other end of the floating lever then acts merely as an extension of the clutch operating lever arm 116, and, except for a small amount of lost motion, the linkage will operate as if the link 135 were connected directly to the clutch operating lever arm 116 and the follow-up valve 132, 133 and motor 130 were omitted. Thus failure of power, as would be caused by failure of the engine to start, will not prevent operation of the shifter.

If power operation of the clutch as well as the shifter is desired, the linkage shown in Fig. 15 may be readily modified to accomplish this. The necessary charges comprise eliminating the spring 137, connecting the link 135 directly to the crank 127 and converting the fork 105 and roller 108 within the shifter into a Geneva motion by cutting off one arm of the fork so that it can pass under the roller after moving the sliding block to its "shift" position. In addition, the link 135 between the clutch lever 116 and the shifter unit 51 should be connected directly to the fulcrum of the floating lever 136 and the link 141 from the clutch pedal shaft should be spaced from the fulcrum, as by interchanging the positions of the ends of the two links.

Either of the above described forms of linkage for operating the shifter by a motor can be used without the motor by merely connecting both the links 135 and 141 directly to the clutch operating lever arm 116.

*Operation*

The operation of the above-described forms is repeated below in brief or résumé form.

The form of the device shown in Figures 1 to 14, inclusive, operates as follows. The transmission being in neutral and the shifter parts being in their corresponding neutral positions, the shifter parts will appear as seen in Figures 1, 6, 7, 8, 9, and 12.

To shift into first or low the handle 24 is moved in the conventional fashion to the left and toward the driver, as seen in Figure 2. The movement of the handle 24 to the left moves shaft 26 axially to the right (since handle 24 is a lever having an intermediate fulcrum in slot 29 and is pivotally connected at its lower end to shaft 26), engages pin 40 in slot 38 of sliding block 35, and disengages pin 39 from this slot 38. Note that in neutral position of the handle 24 both pins 39 and 40 are engaged in slot 38 and hence in this position fore and aft movements of handle 24 are prevented by the unequal lengths of the two pin-carrying arms 33 and 34. The movement of handle 24 toward the driver or downward as seen in Figure 2 rotates shaft 26 which carries arm 34 and engaged pin 40 in a direction to slide block 35 and cable 23 downwardly.

Since in Figure 16 only the structure of the control unit 20 is modified, the movements of its handle 24 will involve a slightly different action in the control unit 20, but the operation of the rest of the structure of Figure 16 from cable 23 on will be the same as in Figure 1 to 14. Thus in Figure 16 movement of the control handle to the left will axially slide shaft 26 to the left to engage pin 40 in slot 38. Then downward movement of handle 24 will rotate arm 34 with its pin 40 counterclockwise to move the slide block 35 and cable 23 toward the shifter unit.

This movement of cable 23 toward the shifter unit will rotate camshaft 79 in a counter-clockwise direction, as shown in Figs. 6, 9 to 12, and 16, for a predetermined distance. This predetermined rotation of the camshaft will rotate its cam 98 so that its notched or cut-in portion will be moved around into a position where it will not prevent the spring-pressed inward movement of the pawl 94 as the sliding block 64 carrying the pawls moves to the left or towards its "shifting" position, which occurs during the first part of the upward movement of the clutch pedal. Consequently, in this movement of the block toward "shifting" position pawl 94 engages recess 92 in lever arm 86 and swings the lever 86, 87, 88 in a counter-clockwise direction to move the shift rail 54 into first position. The inwardly projecting fingers on the pawls 74, 75, 94, 95 may never engage the cams 78 or 98 when the pawl-carrying block is at either end of its travel and hence the cams may be set by the handle 24 and the intermediate mechanism when the sliding block is at either end of its travel or the clutch is either being engaged or is fully disengaged. Thus it will be seen that this shifter may be operated preselectively if desired.

When it is desired to shift from first into second, the handle 24 is moved upward, across to the right, and then upward again, in conventional fashion. These movements rotate the cam shaft 79 to present the notched portion of cam 78 to the inwardly projecting finger of pawl 74. During the last part of the downward movement of the clutch pedal the sliding block 64 moves to the right or towards "neutralizing" position so that the displaced one of the neutralizing cams 101 and 103 will be moved back into aligned or neutral positions by the neutralizing shoes or bosses 102 at the end of the block 64. In this case neutralizing cam 101 and its lever 86, 87, 88 will be swung clockwise into neutral position. Upon the return or shifting movement of the sliding block 64, which occurs upon upward movement of the clutch pedal, pawl 74 will move inwardly to engage recess 72 of the lever 71, 65, 69, and move this lever counter-clockwise to slide rail 53 to second position.

The operation of the other shifting movements will be apparent.

The movements of the conventional clutch pedal and its clutch-operating arm 116 are transmitted to the sliding block 64 by a linkage best seen in Figures 7 and 8. In this linkage, the toggle 113, 114 breaks downwardly to supply a lost motion connection, so that only the bottom portion of travel of the clutch pedal actuates the sliding block of the shifter. The operation of this linkage is more fully described above.

The operation of the form of the device shown in Figure 15 is the same as that of the form of the device shown in Figures 1 to 14 except for the operation of the lost motion supplying Geneva plate, the air motor, and their linkage, which operation is described above.

I claim:

1. In a gear shifter, a member mounted to rotate through equal angles to either side of a neutral position about its axis of rotation and movable along said axis between two or more positions, a second member transversely movable relative to said axis, and means for interconnecting said members at different distances from said axis when said rotatable member is in different positions along its axis.

2. In a gear shifter, manually movable lever means including a handle whose free end is movable in an H-shaped path to actuate said lever means, a member slidable along a straight path, said lever means having one portion at one distance from its fulcrum and placed so as to move into operative engagement with said member as said handle is moved to one side of said H-shaped path and having another portion at a different distance from its fulcrum and placed so as to move into operative relation with said member as said handle is moved to the other side of its H-shaped path, and means to shift the gears of a transmission to any one of four speeds in accordance with that one of the four positions to which said slidable member is moved as said handle is placed in one of the four ends of the legs of its H-shaped path.

3. A flat compact gear shifter including a pair of levers swingable on a common fulcrum pivot, each lever including a pair of oppositely directed arms, said pairs of arms being closely spaced axially, a member having portions movable between and beyond said pairs of lever arms and in a plane parallel to their planes of movement, and means for selectively connecting said member to an arm of one of said levers to swing either of said levers in either direction as said member moves in one direction.

4. A gear shifter including a pair of swingable levers each having a pair of arms extending in opposite directions from a common axis and each connected with a shiftable element of a transmission, a movable member having portions extending between and beyond said levers, said portions carrying surfaces adapted to engage surfaces carried by said levers and to move said levers to a predetermined position as said movable member is moved in one direction, and means for selectively connecting said movable member to the arms of said levers to cause either of said levers to swing in either direction as said member moves in the other direction.

5. A gear shifting member including a pair of swinging members each adapted to be connected to one of the shiftable members of a conventional transmission, a member movable in a direction transverse to the axes of said swinging members and four pawls carried by said member, said pawls being arranged in pairs, the two pawls of each pair being mounted on pivots parallel to the axis of one of the swinging members and being adapted to engage said swinging member on either side of its axis, and means for causing a selected one of said four pawls to operatively engage one of said swinging members.

6. A gear shifter including a gear shifting member swingable about its axis in either direction from a neutral position, means for connecting said shifting member to the mechanism of a transmission to cause gears therein to be shifted one way or another as said shifting member is swung one way or the other, a second shifting member movable in a plane transverse to said axis, a pair of connecting means for transmitting motion from said second shifting member to said gear shifting member, each of said connecting means being movable only in a plane transverse to said axis and said two connecting means acting on said gear shifting member on opposite sides of its axis, and means for selectively rendering said connecting means inoperative, said shifting members having portions placed so as to engage each other and move said swingable gear shifting member to said neutral position whenever said second shifting member is moved to a predetermined position.

7. A gear shifter including a pair of longitudinally slidable shift rails, a shaft perpendicular to said rails, means fixed to the shaft and engaging one rail so as to slide said rail as said shaft is rotated, a member fixed to said shaft, a second member journaled on said shaft between said means and said first member and engaging the other rail so as to slide said other rail as said member is rotated, a block slidable perpendicularly to said shaft, means for sliding said block, and pawls carried by said block and selectively engageable with either of said members at either side of said shaft so as to selectively rotate either of said members in either direction and slide either shift rail in either direction as said block is slid in one direction.

8. A gear shifter and transmission including a shiftable member movable different distances in opposite directions from a neutral position to place different gear trains in operative relation, a swingable element, means for selectively swinging said element equal angles in opposite directions from a neutral position, and means for connecting said element to said shiftable member so that swinging of said element through said equal angles will cause movement of said shiftable member through said different distances.

9. In a transmission, a pair of shift rails lying spaced apart in a common plane, selectively rotatable elements projecting into said plane between said rails, and means extending in said plane from said elements to said rails for transmitting motion from said elements to said rails.

10. A gear shifter including a housing, a gear shifting member pivoted in said housing and swingable in either direction from a neutral position, means for connecting said member to the mechanism of a transmission to cause shiftable members therein to be shifted one way or another as said shifting member is swung one way or the other, a second shifting member movable in a plane transverse to the axis on which said first shifting member can swing, a pair of pawls pivoted to one of said shifting members and adapted to engage the other shifting member, the pivots of said pawls being substantially parallel to said axis and the pawls lying on opposite sides of said axis, and cam means carried by said housing for selectively engaging said pawls and holding either one or both out of operative relation with said shifting members.

11. A gear shifter including a gear shifting member swingable about its axis in either direction from a neutral position, means for connecting said shifting member to the mechanism of a transmission to cause shiftable members therein to be shifted one way or another as said shifting member is swung one way or the other, a second shifting member movable in a plane transverse to said axis, a pair of pawls pivoted to said second shifting member on pivots parallel to said axis and adapted to engage said gear shifting member on opposite sides of its axis, and means for selectively rendering said pawls inoperative.

12. In a gear shifter, means for engaging the shiftable elements of a transmission, a shaft, means for selectively moving said means as said shaft is oscillated back and forth, a lever on said shaft, means for connecting said lever to a clutch pedal, said connecting means including a toggle link placed in tension during the latter part of the downward movement of the clutch pedal and in compression during the upward movement, and means to break said toggle at a predetermined point in said upward movement.

13. In a gear shifter, means for engaging the shiftable elements of a transmission, a member movable back and forth between two positions, means for selectively moving said means by said member, a pin carried by said member, a connecting member connected to a clutch pedal so as to move therewith, said connecting member having a portion engaging said pin and slidable by said pin at an angle to the path thereof and having a slot adjacent said portion and adapted to receive said pin, and means on said connecting member for guiding said pin into said slot.

14. A mechanical movement including a lever mounted to swing about its fulcrum axis and to move along said axis and a cooperating member mounted to move transversely to said axis, said lever and said member being so constructed and arranged that they will be operatively interconnected at different distances from said axis when said lever is in different positions along said axis.

15. An automobile transmission gear shifter including a swingably pivoted shifting handle positioned remote from the transmission and mounted to swing about and to slide along its pivot so that its free end may be moved in the conventional H-shaped path, a single long element running from adjacent said handle to the transmission and having only one type of movement in two different directions and amounts, means for operatively connecting said element to the transmission for determining the shift to be made, and means connecting said handle and said element and so constructed and arranged that it transforms the H-path movement of said handle to the single type movement of said element.

EARL H. PICKETT.